3,709,790
PROTEOLYTIC ENZYME FORMULATION
Jack F. Beuk, 6 S. Madison St., Hinsdale, Ill. 60521, and William D. Warner, 732 Benton Court, Elmhurst, Ill. 60126
No Drawing. Filed Oct. 5, 1970, Ser. No. 78,133
Int. Cl. C07g 7/022
U.S. Cl. 195—66 R        16 Claims

ABSTRACT OF THE DISCLOSURE

An improved method for preparing reversibly inactive plant derived proteolytic enzyme solutions for in vivo intravascular injection wherein: (1) the pH of the enzyme solutions are elevated to between about 8.0–10.0, and (2) the solutions are treated with suitable sequestering agents. These improvements permit the efficient processing of commercial size batches of more concentrated enzyme solutions without treatment with oxidizing agents.

Specification

The present invention generally relates to improvements in processing plant derived proteolytic enzyme solutions for ante-mortem tenderization, and more specifically relates to the processing of such enzyme solutions suitable for ante-mortem intravascular injection of meat bearing animals to obtain uniform tenderization between the meat and organs without adverse physiological reactions to the animals injected.

The use of proteolytic enzymes for ante-mortem injection in the tenderization of animals was first discovered in U.S. Pat. No. 2,903,362, issued Sept. 8, 1959. Since the discovery of this most valuable tenderization technique, considerable research has been conducted to determine the particular advantages of the various proteolytic enzymes and to perfect more efficient methods of preparing enzyme solutions suitable for ante-mortem tenderization.

Until recently it was believed that to avoid certain adverse physiological side-effects to the animals injected, it was necessary to remove certain impurities which are inherent in both crude and food grade sources of such plant derived proteolytic enzymes as papain, bromelain, ficin, and the like. The amounts of these impurities vary substantially according to a variety of factors such as the type of enzyme, the kind of soil in which the plant was grown, and the manner in which the enzyme was handled after being harvested. Removal of the impurities is generally accomplished by filtration. For example, plant materials from which bromelain is obtained generally contain substantially greater quantities of these impurities than do either crude papain or ficin. Historically, the removal of these impurities, although troublesome and time-consuming, was not considered a major factor in the processing of such enzyme solutions since they were conventionally processed at about neutral or slightly alkaline pH levels. However, with the discovery that there were certain advantages to processing bromelain for ante-mortem tenderization at pH levels up to 10.0, as is set forth in the patents to: Young et al., No. 3,442,764 issued May 6, 1969 and McAnelly et al., No. 3,446,626 issued May 27, 1969; the removal of these impurities as precipitates suddenly became a serious problem because at these higher alkaline pH levels, the precipitates multiply into voluminous quantities of a viscous, gummy-like precipitate which make it commercially impractical to clarify commercial size batches of concentrated solutions of bromelain. This is the reason why the teachings of these two patents are directed to laboratory size batches of from 2 to 4% concentration. It should be noted that although the quantity of precipitate varies between the different kinds of some proteolytic enzymes, the volume of precipitate for each enzyme increases sharply as the pH is raised above about 7.0.

Applicants have now developed that the impurities which take the form of voluminous precipitates are not a causative factor in the adverse physiological reaction in the animals injected. Applicants also found that after the addition of suitable sequestering agents, the pH of certain enzymes must be raised to maintain stability. In the case of bromelain, the minimum was increased from about 8.0 to about 9.0. The presence of these sequestering agents plus the higher pH levels also had the effect of reversibly inactivating that fraction in the enzyme solution responsible for the adverse physiological reactions in the injected animals without the addition of extraneous oxidizing agents.

Therefore, it is an object of the present invention to provide an improved method for preparing proteolytic enzyme solutions useful in ante-mortem intravascular tenderization of meat bearing animals.

It is another object of the present invention to provide a more efficient method of preparing proteolytic enzyme solutions suitable for the ante-mortem tenderization of meat bearing animals which, in addition to substantially reducing the undesirable physiological side effects experienced by the animal, also improves the clarification step by substantially increasing the filtration rate of larger batch sizes and more concentrated enzyme solutions, particularly enzyme solutions having a pH between from about 8.0 to about 10.0.

It is another object of the present invention to provide a method for the processing of ante-mortem proteolytic enzyme solutions which avoids the formation of voluminous precipitates normally associated with pH levels above about 8.0 thereby permitting the processing of larger and more concentrated batches of such enzymes than was heretofore possible.

It is a further object of the present invention to provide a method for the purification of proteolytic enzymes for in vivo injection which includes treating the enzyme solution with suitable sequestrating agents which permits a more rapid rate of destruction of the available, but undesirable, milk clotting fraction even at lower temperatures of about 10° C., thereby substantially reducing the possibility of bacterial contamination.

It is yet another object of the present invention to provide a more efficient method of processing proteolytic enzyme solutions for ante-mortem tenderization of meat bearing animals which permits the use of ordinary tap water and the processing of commercial size batches which are 2–5 times more concentrated than heretofore was possible for such enzyme solutions having a pH between from about 8.0 to about 10.0.

It is a further object of the present invention to provide a method for processing proteolytic enzyme solutions for in vivo injection which eliminates the use of hydrogen peroxide or other oxidizing agents thereby increasing the total enzyme activity of such solutions by as much as 15–20%.

It is yet a further object of the present invention to provide a method for improving the filtration rate of proteolytic enzymes for in vivo injection such as papain, bromelain, ficin, and mixtures thereof by increasing the pH to from about 8.0 to about 10.0 and treating with sufficient amounts of suitable sequestering agents to avoid the voluminous precipitates usually associated with such clarification procedures.

Additional objects of the present invention, if not specifically set forth herein, will be readily apparent to those skilled in the art from a reading of the following detailed description of the invention.

Generally, the invention relates to certain critical modifications of known methods for the preparation of ante-mortem proteolytic enzymes, such as efficiently processing such enzyme solutions at pH levels of between from about 8.0 to about 10.0 and avoiding the customary treatment with oxidizing agents. More specifically, it has been discovered that the inherent impurities customarily associated with such plant derived enzymes and which form voluminous precipitates at these higher pH levels are not responsible for the adverse physiological side effects of the injected animals. As a result of this discovery, commercial scale batches of more concentrated enzyme solutions can be processed after being treated with suitable sequestering agents. In addition, the processing of such enzyme solutions at these more alkaline pH levels and at lower temperatures also make it possible to avoid treatment with oxidizing agents, which agents are responsible for a 15–20% loss in the enzyme activity.

It is presently believed that all powders or solutions of sulfhydryl proteolytic enzymes originally contained three kinds of enzyme molecules. These may be classified as "active," "reversibly inactive" and "irreversibly inactive" enzyme molecules.

"Active" enzyme molecules produce the meat tenderization through proteolysis, but accordingly cause severe physiological reactions when injected into live animals. For example, intravascular injection of live animals with crude enzyme solutions of either papain, bromelain, ficin, or combinations thereof include a substantial portion of active enzyme molecules which produce such symptoms as labored breathing, nasal congestion, depression, frothing at the mouth, and in severe cases the animal will become cyanotic and die. The autopsy findings of such "reactors" usually include hemorrhaging in the kidneys, heart, liver, intestines, gall bladder, and larynx. As a result of these symptoms, the "reactors" are condemned by the governmental inspectors. Fully active enzymes may cause very rapid expiration of the animal.

"Irreversibly inactivated" enzyme molecules are those which, due to oxidation, hydrolysis, etc., of the active enzyme molecule, have been permanently neutralized, at least under the operating conditions of processing ante-mortem tenderization enzyme solutions, and therefore have been found to produce no tenderization effect or animal reaction.

"Reversibly inactive" enzyme molecules appear to produce no tenderization or adverse animal reactions upon intravascular, in vivo injection, but appears to produce the characteristics of being reactivated within the animal's vascular system thereby producing subsequent tenderization of the meat. Therefore, it is most desirable in methods of ante-morten meat tenderization by intravascular injection to inject an enzyme solution containing as high a concentration of "reversibly inactive" enzyme molecules as is possible. That is to say, the problem of eliminating animal reaction is to reversibly inactivate the active enzyme molecules in such a manner that the enzyme will be reversibly inactivated at the time of injection and will not be reactivated between injection and slaughter or at least will be reactivated at a substantially slower rate. It should be noted that post-morten meat will activate sulf-hydryl proeolytic enzymes by itself without an activator being added. Therefore, in ante-morten injection only "reversibly inactivated" enzymes can be used whereas with post-morten injection it is permissible to use either "active" molecules or "reversibly inactive" molecules or a combination of both. This is because in post-morten injection there is no problem of animal reaction and, therefore, active enzyme molecules are preferred.

From the above, it will be recognized by those skilled in the art of ante-morten tenderization, that the problems and their solutions encountered in other types of meat tenderization involving proteolytic enzymes, which do not include in vivo, intravascular injection, cannot be interrelated. This is because other types of meat tenderization relate to external application, or to post-morten injection, which methods permit the proteolytic enzymes solution to be "activated" to the fullest extent possible, often by treatment with reducing agents. For example, see: U.S. patent to Schwartz et al., No. 2,958,632 issued Nov. 1, 1960 and U.S. patent to Cayle, No. 3,284,316, issued Nov. 8, 1966. Since crude and food grade proteolytic enzyme powders consisting of combinations of "activated," "reversibly inactivated" and "irreversibly inactivated" enzyme molecules are too active for intravascular, in vivo injection, it is obvious that totally "activated" enzyme solutions, such as are taught by the Cayle and Schwartz et al. patents, are unrelated to the ante-mortem tenderization art.

Several processes for inactivation of enzyme powders and solutions are known in the art, such as, by oxidation, $H_2O_2$, air, etc. However, oxidation inactivation tends to irreversibly inactivate "active" enzyme molecules leaving only the original "reversibly inactive" molecules in the enzyme powder for subsequent reactivation. This results in an enzyme solution having a relatively small amount of "reversibly inactive" enzyme and a relatively large amount of "irreversibly inactivated" enzyme.

The accepted method for developing a quantitative determination as to the enzyme activity of "active" molecules and as to the total enzyme activity, which is made up of both the active enzyme molecules and the "reversibly inactive" enzyme molecules, is set forth in the patent to McAnelly et al., No. 3,44,626 at Columns 3 and 4. Essentially, the amount of "active" enzyme molecules in a given solution is determined by employing a milk clot assay of the available enzyme activity, the procedure for which uses no reducing agents. The units for measuring "active" enzyme molecules are generally called the non-reduced milk clot units (N-RMCU) and are sometimes referred to as the available milk clot activity (AMCU). Where a measure of the "reversibly inactive" enzyme molecules is desired, a second portion of the enzyme solution is treated with an activator or reducing agent such as cysteine, cyanide, bisulfite or the like whereby all the "reversibly inactivated" enzyme is restored to the "active" state. The milk clot assay using added cysteine or other activators measures both the "active" and the "reversibly inactive" enzyme molecules, it is generally referred to as either the Reduced Milk Clot Method (RMCU) or the Total Milk Clot Activity Method (TMCU) since it is a measure of the total enzyme activity, and any reduction in this value during processing indicates a loss in the overall enzyme activity of the solution being assayed. However, reduction in the N-RMCU without a corresponding reduction in the RMCU value, indicates the amount of "active" enzyme molecules which have been converted to "reversibly inactivated" molecules.

In the present invention, it has been discovered that the voluminous precipitates encountered in the processing of bromelain at pH levels of between 8.0–10.0 could be avoided by treating the enzyme solutions with suitable sequestering agents. Since these precipitates are more voluminous with bromelain than with papain and ficin, it is necessary to add up to 50% or more by weight of the enzyme source material of suitable sequestering agents in order to avoid the formation of these precipitates at pH levels of about 9.0. However, much smaller amounts of sequestering agents are required in the processing of papain and ficin. It was also observed that in the presence of suitable sequestering agents, the N-RMCU values were reduced at a significantly higher rate without a corresponding reduction in RMCU values; or, in other words, that at these more alkaline pH levels in the presence of suitable sequestering agents the "reversibly inactive" enzyme molecules exhibit good stability while at the same time the "active" enzyme molecules were rapidly converted to "reversibly inactive" enzyme molecules. Since this latter conversion is effective without the use of an oxidizing agent, the usual loss of 15–20% in the total enzyme activity is avoided.

Papain and ficin generally exhibit more stability at pH levels somewhat lower than does bromelain, and therefore have been generally processed at slightly acidic or at neutral pH levels, at which pH levels little or no precipitate occur. When these enzymes are processed at pH levels of between 7.5 and about 10.0, it is not uncommon to encounter batches of crude and food grade enzyme powders which produced the same voluminous, gummy-like precipitates which are encountered in the processing of bromelain. The addition of suitable sequestering agents satisfactorily avoids formation of these precipitates and also produces these same desirable results as are encountered in the processing of bromelain; namely, that the "active" enzyme molecules are converted to "reversibly inactive" enzyme molecules without the addition of oxidizing agents and without any substantial reduction in the total enzyme activity.

Without the presence of these voluminous, gummy-like precipitates, it is now commercially practical for the first time to clarify or otherwise process large concentrated batches of these proteolytic enzymes suitable for ante-mortem injection.

Ordinarily, the starting enzyme solutions used in the present invention are prepared by first forming a paste of a commercial-plant derived proteolytic enzyme powder such as bromelain and an equal weight of an organic water-soluble liquid, such as glycerine, glycols, or other water-soluble or water-dispensable wetting agents. The paste thus formed is then dissolved in water having a temperature of about 10–15° C. in order to prepare the working solution. The amount of sequestering agents required to retain the impurities in solution will vary substantially as between the different kinds of proteolytic enzymes, sequestering agents, and mixtures thereof which are employed. For example, in the processing of bromelain, EDTA was added in an amount of about 50% by weight of the bromelain source and the pH of the solution was adjusted to 9.0. The solution was then clarified by filtration. Thereafter, the clarified solution was again adjusted to pH 9.0 and allowed to stand overnight at about 10° C. It will be understood, however, that this procedure is not critical to the operability of the present invention, and alternative methods for preparing suitable enzyme solutions may be employed.

In the processing of bromelain, papain and ficin with sequestering agents, the pH is generally adjusted to between 8–10 since above about pH 10 all three enzymes begin to show loss of enzyme activity due to the denaturization.

Since the addition of suitable sequestering agents makes it possible for the first time to keep substantially all the precipitous impurities in solution, it is now possible to process such enzyme solutions which are 2–5 times more concentrated. For example, the process taught in the McAnelly, et al. Pat. No. 3,446,626, teaches enzyme solutions of from 2 to 4% concentration, whereas it is now possible to purify proteolytic enzyme solutions of 10% concentration.

To illustrate the effectiveness of various sequestering agents in the purification of such proteolytic enzyme solutions which are here under consideration, a comparison of bromelain was made of the filtration time and the Total Milk Clot Units (TMCU) at pH level of 6.0, 7.5, and 9.0 (see Table I).

In each case, a solution of the sequestering agent was prepared in a separate beaker, adjusted to pH 9.0 and then added to the main enzyme solution slowly with the stirring. An enzyme solution was prepared by making a slurry of 20.0 grams of bromelain powder plus 20.0 grams of glycerine. The 300 ml. of cold tap water was added and thoroughly mixed with the aid of a magnetic stirrer. As the sequestering solution was added the pH dropped, usually below pH 6, and the pH was adjusted to a final pH of either 6.0, 7.5, or 9.0.

Each solution was then adjusted to a final volume of 500 ml. and allowed to set in a refrigerator for ½ hour before filtrating. The filtration procedure was standardized to the following conditions:

(1) 1% Hyflo Super Cel filter was added;
(2) 15° C. ± 2;
(3) 9 cm. Buchner funnel;
(4) #617 E & D Filter paper;
(5) Vacuum 25–27 inches;
(6) 2.5 gm. Hyflo Super Cel in a water suspension was poured on paper to seal the paper against the funnel.

Passage of the enzyme solution, containing 1% Hyflo Super Cel (5 gm./500 ml.), through the filter was timed by stop watch. Two 80 ml. quantities of filtrate were aged 20 hours at 10° C., frozen, and finally analyzed when convenient.

TABLE I.—EFFECT OF SEQUESTERING AGENTS ON THE FILTRATION AND STABILITY OF BROMELAIN SOLUTIONS

[TMCU = total milk clot units]

| Grams/500 ml. solution | Molarity | Percent [1] | pH 6.0 Filter time (sec.) [2] | pH 6.0 TMCU | pH 7.5 Filter time (sec.) [2] | pH 7.5 TMCU | pH 9.0 Filter time (sec.) [2] | pH 9.0 TMCU |
|---|---|---|---|---|---|---|---|---|
| 1. Control (no sequestering agent added) | | | 92 | 14 | 300 | 22 | 300 | 59 |
| 2. Na Citrate (MW=294): | | | | | | | | |
| 7.35 | 0.05 | 36.5 | 58 | 16 | 100 | 14 | 300 | 47 |
| 14.7 | 0.10 | 73.5 | 39 | 17 | 40 | 27 | 300 | 54 |
| 29.4 [3] | 0.20 | 147.0 | 40 | −21 | 41 | 25 | 34 | 67 |
| 58.8 | 0.40 | 294.0 | −45 | 31 | 47 | 30 | 41 | 66 |
| 3. Na₄(EDTA) (MW 416) (tetra sodium salt of ethylene diaminetetra acetic acid): | | | | | | | | |
| 5.2 | 0.025 | 26.0 | 39 | 16 | 41 | 21 | 300 | 64 |
| 10.4 [3] | 0.050 | 52.0 | 35 | 17 | 50 | 24 | 51 | 67 |
| 20.8 | 0.100 | 104.0 | 41 | 21 | 54 | 15 | 54 | 66 |
| 4. Na₂EDTA (MW 372): | | | | | | | | |
| 4.65 | 0.025 | 23.2 | 37 | 13 | 82 | 26 | 300 | 61 |
| 9.3 [3] | 0.050 | 46.5 | 35 | 20 | 31 | 34 | 41 | 59 |
| 18.6 [3] | 0.100 | 93.0 | 38 | 24 | 30 | 27 | 38 | 63 |
| 5. NTA (nitrilotriacetic acid (MW 191): | | | | | | | | |
| 2.39 | 0.025 | 11.9 | 42 | 14 | 300 | 63 | 300 | 59 |
| 4.78 [3] | 0.05 | 23.9 | 37 | 10 | 38 | 20 | 38 | 61 |
| 9.55 [3] | 0.10 | 47.7 | 44 | 13 | 37 | 61 | 40 | 61 |
| 19.1 | 0.20 | 95.5 | 39 | 21 | 35 | 47 | 51 | 61 |
| 6. DETPA (diethylenetriamine pentaacetic acid) (MW 393): | | | | | | | | |
| 4.92 | 0.025 | 24.6 | 42 | 15 | 45 | 34 | 300 | 54 |
| 9.85 [3] | 0.050 | 49.2 | 44 | 20 | 36 | 33 | 56 | 49 |
| 19.7 [3] | 0.10 | 98.5 | 55 | 31 | 44 | 27 | 53 | 50 |

TABLE I—Continued

| Grams/500 ml. solution | Molarity | Percent [1] | pH 6.0 Filter time (sec.) [2] | TMCU | pH 7.5 Filter time (sec.) [2] | TMCU | pH 9.0 Filter time (sec.) [2] | TMCU |
|---|---|---|---|---|---|---|---|---|
| 7. HEEDTA (hydroxyethylene diaminetriacetic acid) (MW 278): | | | | | | | | |
| 3.47 | 0.025 | 17.3 | | | | | 300 | 65 |
| 6.95 [3] | 0.050 | 34.8 | | | 36 | 29 | 29 | 67 |
| 13.9 | 0.10 | 69.5 | 42 | 16 | 34 | 30 | 44 | 61 |
| 27.8 | 0.20 | 135.0 | | | | | 46 | 62 |
| 48.7 | 0.35 | 243.5 | | | | | 67 | 68 |
| 8. EDG (N-hydroxyethylimino diacetic acid) (MW 178): | | | | | | | | |
| 2.23 | 0.025 | 11.1 | 65 | 15 | 300 | 25 | 300 | 56 |
| 4.45 | 0.050 | 22.5 | 43 | 19 | 83 | 71 | 300 | 65 |
| 8.9 [3] | 0.100 | 44.5 | 42 | 17 | 49 | 67 | 36 | 65 |
| 17.8 | 0.200 | 89.0 | | | | | 40 | 65 |
| 9. Tetra sodium pyrophosphate (Na$_4$P$_2$O$_7$:10 H$_2$O) (MW 416): | | | | | | | | |
| 10.4 | 0.05 | 52.0 | | | | | 300 | 61 |
| 20.8 | 0.10 | 104.0 | | | | | 300 | 44 |
| 31.6 [3] | 0.15 | 158.0 | 300 | 30 | 300 | 32 | 55 | 57 |
| 41.6 | 0.20 | 208.0 | | | | | 43 | 67 |
| 10. Na tripolyphosphate (Na$_5$P$_3$O$_{10}$) (MW 368): | | | | | | | | |
| 2.3 | 0.0125 | 11.5 | | | | | 300 | 47 |
| 4.6 | 0.025 | 23.0 | | | | | 57 | 61 |
| 9.2 [3] | 0.05 | 46.0 | | | | | 42 | 56 |
| 18.4 [3] | 0.10 | 92.0 | | | | | 46 | 53 |
| 27.6 | 0.15 | 138.0 | 51 | 38 | 48 | 40 | 58 | 51 |
| 11. Na hexameta phosphate (NaPO$_3$) (MW 612): | | | | | | | | |
| 1.91 | 0.063 | 9.5 | | | | | 300 | 57 |
| 3.82 | 0.0125 | 19.1 | | | | | 49 | 68 |
| 7.65 [3] | 0.025 | 38.2 | 30 | 25 | 40 | 76 | 38 | 68 |
| 15.3 [3] | 0.05 | 76.5 | | | | | 41 | 68 |
| 30.6 | 0.10 | 153.0 | | | | | 60 | 64 |
| 61.2 | 0.20 | 306.0 | | | | | 109 | 51 |
| 91.8 | 0.30 | 459.0 | | | | | 198 | 35 |

[1] The percent by weight of sequestering agent to bromelain (500 ml. solution containing 20 gm. bromelain powder or a 4% bromelain solution).
[2] The filtration time was determined for 300 seconds or less. Thus any filtration time of 300 seconds should be interpreted as 300 seconds or greater.
[3] Ratios of sequestering agents required for best filtration.

All sequestering agents behaved in a similar fashion in that the solutions were all unstable at pH 6.0 and 7.5, whereas those prepared at pH 9.0 were stable. The data indicated that the control solution, i.e., with no sequestering agent added, filtered relatively fast at pH 6.0, but that the rate of filtration became progressively slower as the pH increased. This can be explained by the fact that substantially greater amounts of "slimy" precipitates are formed in the solution as the pH increases. Lower levels of sequestering agents can be used at the lower pH levels such as pH 6 and still obtain improved filtration.

Therefore, when processing bromelain the most favorable use of a sequestering agent is about pH 9.0 because: (1) the enzyme is stable at this pH; (2) the adverse side effects in animals are reduced by aging at this pH; and (3) the filtration rate is satisfactory.

It will be obvious to those skilled in the art that the use of such high concentrations of these compositions will frequently make it desirable to use various combinations of different sequestering agent in order to avoid excessively heavy concentration of particular ions in the enzyme solution.

From the above, it is obvious the choice of sequestering agents is not critical to this invention and the selection of a suitable sequestering agent would be hereafter within the knowledge of those skilled in the art for purifying and stabilizing enzyme solutions suitable for ante-mortem tenderization.

The following examples are given as illustrative of the present invention in comparison with other known methods of purifying and stabilizing proteolytic enzyme solutions suitable for ante-mortem injection and are not in any way to be considered as limiting to the spirit or scope of the invention.

EXAMPLE I (A) Fifty pounds of a commercial food grade bromelain was wetted with an equal weight of C. P. glycerine mixed to about the consistency of paste and diluted with about 470 liters of cold distilled water. The pH was adjusted to 9.0 with sodium hydroxide and stirred for 30 minutes for complete solubilization of the enzyme powder. The pH was again adjusted to 9.0 and the volume was adjusted to 568 liters (4%) with cold distilled water. 500 ml. was withdrawn for filtration rate tests and the remainder was filtered through a commercial Seitz press using clarifying pads and 3% Hyflo Super Cel. This is the method taught in U.S. Pat. No. 3,446,626 in which after clarification the solution is aged and then treated with peroxide before it is rendered suitable for ante-mortem injection.

(B) Fifty pounds of a commercial food grade bromelain was melted with an equal weight of C.P. glycerine, mixed to about the consistency of paste and diluted with about 470 liters of cold distilled water. The pH was lowered to 4.5 with HCl and the solution stirred for 10–15 minutes for maximum solubilization of the bromelain. 0.8% of magnesium oxide (USP Heavy) was added to the mixture while stirring, and the stirring continued until the pH of the mixture reached 9.0. The volume was adjusted to 568 liters (4%). 500 ml. was again withdrawn for filtration rate test and the remainder clarified using 3% filter aid. Filtration via magnesium oxide is the method disclosed in U.S. Pat. No. 3,442,764 in which after clarification the solution is aged and treated with peroxide.

(C) Fifty pounds of a commercial food grade bromelain was wetted with an equal weight of C.P. glycerine, mixed to about the consistency of paste and diluted with about 470 liters of cold tap water. Twenty-five pounds of EDTA was added and the pH adjusted to 9.0 with sodium hydroxide. The volume was adjusted to 568 liters and 500 ml. was withdrawn for filtration rate tests. Then 1% of the Hyflo Super Cel was added and the enzyme solution passed through a Seitz press.

Comparative tests were made for each of the above solutions in which a 500 ml. volume at pH 9.0, 15° C. and passed through a 9 cm. Buchner funnel under a 25 inch vacuum, and the filtration time clocked by stop watch. Each solution was then adjusted to a final volume of 500 ml. and allowed to set in a refrigerator for ½ hour before filtrating. The filtration procedure was standardized to the following conditions:

(1) 1% Hyflo Super Cel filter was added;
(2) 15° C. ±2;
(3) 9 cm. Buchner funnel;
(4) #167 E & D Filter paper;
(5) Vacuum 25–27 inches;
(6) 2.5 gm. Hyflo in a water suspension was poured on paper to seal the paper against the funnel.

Passage of the enzyme solution, containing 1% Hyflo Super Cel (5 gm./500 ml.), through the filter was timed by stop watch. Two 80 ml. quantities of filtrate aged 20 hours at 10° C., frozen, and finally analyzed when convenient. The results were as follows:

| Samples: | Filtration time (seconds) |
|---|---|
| A | 1800 |
| B | 240 |
| C | 53 |

Additional conclusions drawn from the above examples were:

(1) Sample A formed a high volume of precipitate at pH 9.0 which required over-sized, expensive asbestos plates and filter press, required large quantities of Hyflo Super Cel for filtration, and the filtration rate was too slow for commercial application. The large quantities of hydrogen peroxide required to remove the undesirable animal fraction significantly reduced the concentration of the enzyme activity of the solution.

(2) Sample B formed a large volume of precipitate and required large quantities of Hyflo Super Cel and even though the filtration time was improved over that of Sample A, it was too slow for commercial enzyme production. Every batch of magnesium oxide and bromelain powder must be tested together to obtain optimum advantages. There is no control over the pH prior and during filtration due to the magnesium oxide present.

(3) Sample C produced sufficiently lower amounts of precipitate which permits the use of conventional filtration equipment, allows for the processing of large volume batches, requires smaller amount of Hyflo Super Cel to facilitate filtration, enables the use of tap water instead of distilled water, and permits the use of bromelain crude powders not heretofore acceptable for preparation of ante-mortem solutions and also permits filtration of more concentrated solutions. The elimination of the oxidizing step resulted in a 15–20% higher yield. The lower amounts of precipitate permits the filtration of solutions which are 2–5 times more concentrated than current commercial bromelain solutions. Also because the adverse side effects produced by injecting non-treated solutions into animals can be reduced by holding at 10° C. (instead of 15–18° C.), the possibility of bacterial growth is reduced.

EXAMPLE II 50 grams of crude ficin powder (Takamine) was mixed with 50 grams of C.P. Glycerine to form a smooth paste. Cold distilled water was added to make approximately 400 ml. of solution. 25 grams of EDTA was added with mixing and the pH was adjusted to pH 9.0 with 5 N NaOH. The volume was adjusted to 500 ml. (10% solution). The filtration rate was then compared with an identical solution except that no EDTA was added. The standard technique as outlined in Example I was used with the following results:

| | Filter time |
|---|---|
| Ficin | 15 minutes (greater than).[1] |
| Ficin+EDTA | 73 seconds. |

EXAMPLE III

The same procedure as outlined in Example II was followed except that crude papain was substituted for ficin. The filtration rates were determined as follows:

| | Filter time |
|---|---|
| Papain | 5 minutes (greater than).[1] |
| Papain+EDTA | 32 seconds. |

[1] Filter time was arbitrarily cut off at the time indicated.

The use of sequestering agents show the greatest improvement in filtration and processing of bromelain solutions. However, Examples II and III demonstrate that the invention is useful filtering concentrated solutions of ficin and papain as well.

EXAMPLE IV

To illustrate that mixtures of suitable sequestering agents used separately, the following series of solutions (Table II) were prepared and filtered at pH 8.0 using the same method of preparation as outlined for the bromelain of Table I.

Table II

| Concentration level: | Filter time (seconds) |
|---|---|
| 0 | 143 |
| 0.3% EDTA | 130 |
| 0.5% EDTA | 110 |
| 0.7% EDTA | 95 |
| 0.9% EDTA | 84 |
| 1.1% EDTA | 67 |
| 1.3% EDTA | 56 |
| 1.5% EDTA | 42 |
| 1.7% EDTA | 38 |
| 0.25% citrate | 125 |
| 0.50% citrate | 94 |
| 0.75% citrate | 70 |
| 1.00% citrate | 42 |
| 1.25% citrate | 32 |
| 1.50% citrate | 30 |
| 2.00% citrate | 30 |
| 2.50% citrate | 29 |
| 0.2% EDTA+0.2% citrate | 100 |
| 0.4% EDTA+0.4% citrate | 71 |
| 0.6% EDTA+0.6% citrate | 35 |

From the above data, it can be seen that the solution with 0.2% EDTA+0.2% citrate added, filters at the same rate as a 0.4% solution of either sequestering agent. Thus the effect of mixing sequestering agents is that of an additive effect.

Obviously many modifications and variations of the invention as hereinbefore set forth may be made without departing from the spirit and scope thereof, and, therefore, only such limitations should be imposed as are indicated in the appended claims.

We claim:

1. An improved method for preparing plant derived proteolytic enzyme solutions suitable for anti-mortem intravascular injection comprising: treating plant derived proteolytic enzyme solutions with a suitable sequestering agent in an amount sufficient to avoid a voluminous precipitate during the clarification of the enzyme solutions, adjusting the pH of the unclarified enzyme solutions to between 8.0–10.0, thereafter readjusting the pH of the enzyme solutions when lowered substantially below the desired level of between about 8.0–10.0 and holding the enzyme solutions at a pH level of between about 8.0–10.0 for a time sufficient to reversibly inactivate the enzyme present without the addition of extraneous oxidizing agents.

2. The method of claim 1 wherein adjusting the pH of the unclarified enzyme solutions to between about 8.0–10.0 occurs as the enzyme solutions are being treated with a suitable sequestering agent.

3. The method of claim 1 wherein treating the enzyme solutions with a suitable sequestering agent preceeds the adjusting of the pH of the unclarified enzyme solutions.

4. The method of claim 1 wherein adjusting the pH of the unclarified enzyme solutions preceeds the treating of the enzyme solutions with a suitable sequestering agent.

5. The method of claim 1 wherein the pH of the sequestering agent is adjusted to between 8.0–10.0 prior to being added to the enzyme solutions.

6. The method of claim 1 wherein the pH of the enzyme solutions are maintained at substantially between about 8.0–10.0 after the pH adjustment of the unclarified enzyme solutions.

7. The method of claim 1 wherein the proteolytic enzyme is bromelain, the bromelain solution is treated with a suitable sequestering agent and the pH is thereafter maintained at about 9.0, the bromelain solution is clarified by filtration and the clarified bromelain solution is held overnight at about pH 9 at about 10° C.

8. The method of claim 1 wherein the enzyme solution is selected from the group consisting of papain, bromelain, filcin and mixtures thereof.

9. The method of claim 1 wherein the enzyme is bromelain and the pH is maintained between about 9.0–10.0.

10. The method of claim 1 wherein the enzyme is papain and the pH is maintained between about 8.0–10.0.

11. The method of claim 1 wherein the enzyme is ficin and the pH is maintained between about 8.0–10.0.

12. The method of claim 1 wherein the enzyme solution is held at about 10° C. during the period when the enzyme solution is being reversibly inactivated.

13. The method of claim 1 wherein the sequestering agents are selected from the group consisting of citrate salts, tetrasodium ethylene diamine tetra-acetic acid, disodium ethylene diamine tetra-acetic acid, nitrilotriacetic acid, di-ethylenetriamine pentaacetic acid, hydroxyethlene daminetri-acetic acid, N-hydroxyethlimino diacetic acid, tetrasodium pyrophosphate, sodium tripolyphosphate, sodium hexametaphosphate, and mixtures thereof.

14. In the method of claim 13 wherein the sequestering agent is a sodium salt of ethylene diamine tetra-acetic acid.

15. In the method of claim 13 wherein the sequestering agent is a sodium citrate.

16. In the method of claim 13 wherein the sequestering agent is a mixture of ethylene diamine tetra-acetic acid and a citrate.

References Cited

UNITED STATES PATENTS 3,284,316 11/1966 Cayle _____ 195—63
3,446,706 5/1969 Beuk _____ 195—66 R LIONEL M. SHAPIRO, Primary Examiner U.S. Cl. X.R.

99—107

PO-1050
(5/69)

UNITED STATES PATENT OFFICE
CERTIFICATE OF CORRECTION

Patent No. 3,709,790          Dated January 9, 1973

Inventor(s) JACK F. BEUK and WILLIAM D. WARNER

It is certified that error appears in the above-identified patent and that said Letters Patent are hereby corrected as shown below:

The patent should show on its face that it is assigned to Swift & Company of Chicago, Illinois.

Column 3, line 54 - after methods of, cancel "ante-morten" and substitute therefor -- ante-mortem --; line 63 - after noted that, cancel "post-morten" and substitute therefor -- post-mortem --; line 65 - after in, cancel "ante-morten" and substitute therefor -- ante-mortem --; line 67 - cancel "post-morten" and substitute therefor -- post-mortem --; line 69, cancel "post-morten" and substitute therefor -- post-mortem --; line 73, cancel "ante-morten" and substitute therefor -- ante-mortem --;

Column 4, line 3, cancel "post-morten" and substitute therefor -- post-mortem --; line 31, cancel "3,44,626" and substitute therefor -- 3,446,626 --;

Column 6, line 19, cancel "level" and substitute therefor -- levels --;

Column 7, line 39, cancel "solution" and substitute therefor -- solutions --; line 56, cancel "agent" and substitute therefor -- agents --;

Column 9, line 46, cancel "large" and substitute therefor -- larger --;

Column 10, line 19, after agents, insert -- are equally as effective in improving filtration rates of proteolytic enzyme solutions as the same sequestering agents --;

Signed and sealed this 13th day of November 1973.

(SEAL)
Attest:

EDWARD M. FLETCHER, JR.
Attesting Officer

RENE D. TEGTMEYER
Acting Commissioner of Patents